United States Patent [19]

Brecht

[11] 4,240,722
[45] Dec. 23, 1980

[54] INFORMATION DATA MICROFILM PROJECTOR FOR VEHICLES

[76] Inventor: Frederick R. Brecht, 3241 Duncan Ave., Sarasota, Fla. 33579

[21] Appl. No.: 8,411

[22] Filed: Feb. 1, 1979

[51] Int. Cl.³ ............................................. G03B 21/10
[52] U.S. Cl. ...................................... 353/12; 40/904; 353/74; 353/112; 353/85
[58] Field of Search ....................... 353/13, 14, 11, 12, 353/74, 75, 76, 27 R, 77, 78, 111, 112, 113, 85, 87; 40/367, 502, 904

[56] References Cited

U.S. PATENT DOCUMENTS

| | | | |
|---|---|---|---|
| 1,572,671 | 2/1926 | Myers | 353/74 |
| 2,853,816 | 9/1958 | Rogas | 40/367 |
| 3,561,861 | 2/1971 | Mayer | 353/74 |

FOREIGN PATENT DOCUMENTS

| | | | |
|---|---|---|---|
| 1051027 | 2/1959 | Fed. Rep. of Germany | 353/112 |
| 892546 | 4/1944 | France | 353/112 |
| 2395525 | 1/1979 | France | 353/12 |

*Primary Examiner*—John W. Shepperd
*Attorney, Agent, or Firm*—Hauke and Patalidis

[57] ABSTRACT

A microfilm projector installed in the dashboard or instrument panel of a vehicle such as an automobile, a boat, an aircraft, and the like, comprising a rear projection screen mounted in a cut-out portion of the dashboard or instrument panel, a projection lens system and an illumination device for projecting on the rear surface of the screen an enlarged image of information photographically recorded in a transparency card made of a length of microfilm sandwiched between a pair of laminated transparent carriers. The information data transparency card is introduced through a slot in the top of the dashboard or instrument panel and is gravity fed in a chute to an aperture window disposed between the illuminating and lens projecting systems. Controls are provided for turning on and off the illuminating lamp, for stopping and indexing the transparency card at the aperture window, and for dropping the card, after use, into an appropriate receptacle disposed below the chute. The information data recorded on the transparency card may consist of pertinent portions of an operation manual, check lists, charts, navigation charts, harbor or airport maps, airport approach plates, or the like.

7 Claims, 6 Drawing Figures

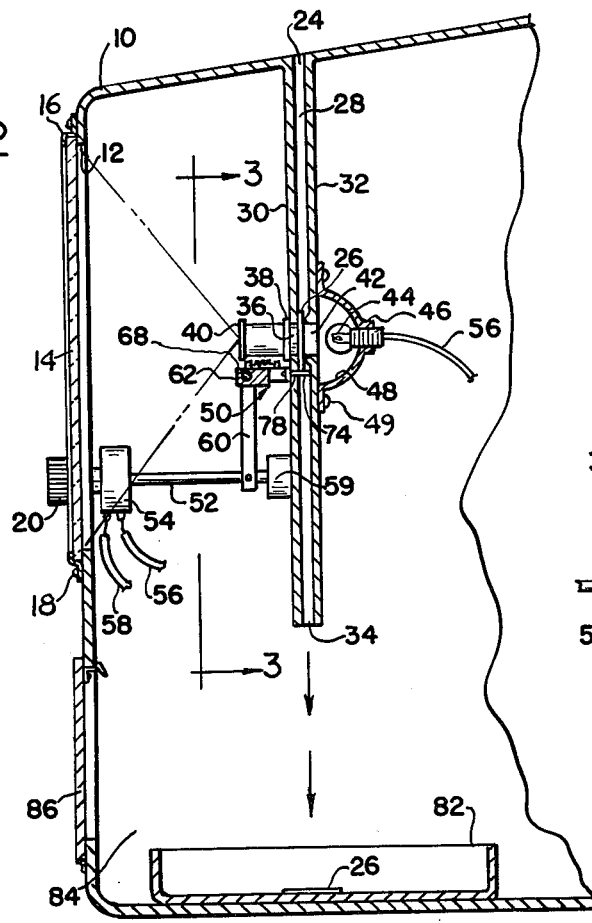
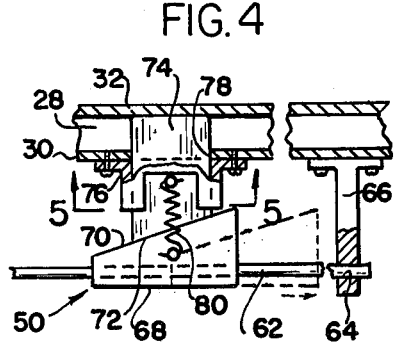
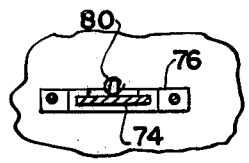
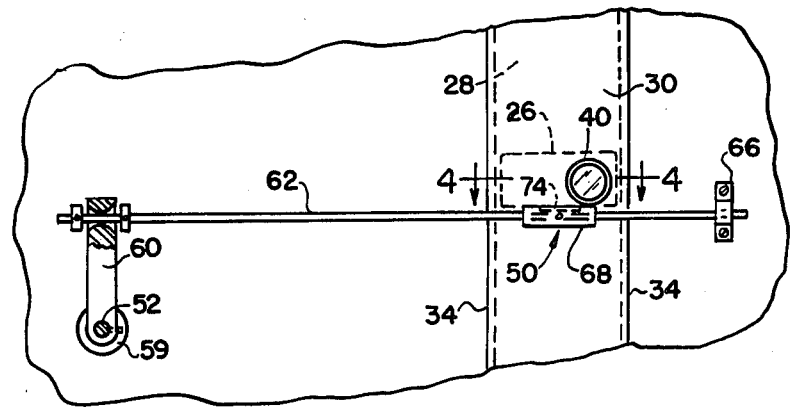

INFORMATION DATA MICROFILM PROJECTOR FOR VEHICLES

CROSS-REFERENCE TO RELATED APPLICATIONS

The present application is related to application Ser. No. 955,790, filed Oct. 30, 1978 for Indicia Bearing Plastic Laminate and Method of Producing Same.

BACKGROUND OF THE INVENTION

It is rather common to provide owners or operators of motor vehicles such as automobiles, trucks and buses, and the owners or operators of sailboats, motor boats and aircraft with an operator's or instruction manual providing information on the characteristics, operation and limitations of the vehicle, on procedures for detecting and remedying malfunctions and for adequate maintenance. Such operator's procedure manuals are in the form on a booklet or book which, depending on the manufacturer's policy and on the complication or difficulty of operation of the vehicle, may be of substantial size and consisting of a substantial number of pages. Such operator's manuals are often stored in the glove compartment, when the vehicle dash or instrument panel is so provided, or in a side panel or backseat pocket.

Aircraft pilots are called upon to consult a checklist and to follow a carefully planned sequence of steps preparatory to engine start, during runup prior to take-off, and prior to landing. Such checklists in a printed form, are either of large size, or consisting of several separate sheets, and thus awkward to handle as they must be held in one hand while operating the controls with the other hand or clipped on a knee clipboard to free the hands. They are subject to rapid deterioration, through repeated use, and they are often misplaced or lost after use. In addition, aircraft pilots during flight and approaches to airports must consult airways charts and other navigation charts, radio facilities charts and approach plates describing the appropriate procedure and profile for visual and instrument approach to the runway. Navigation charts and approach plates are printed on very light thin paper which deteriorates rapidly through continuous use, which is awkward to handle, sometimes difficult to read, and they are easily lost when removed from their looseleaf binders.

The present invention permits to replace operation manuals, instructions, checklists, charts, maps and other often-consulted operation and procedural printed information by a small number of appropriate transparent plastic cards each providing a substantial volume of information data condensed in the form of a transparent microfilm capable, after introduction into the projection device of the invention, to be controllably displayed on a screen mounted on the face of a vehicle instrument panel for providing a visible magnified representation of the information under easy observation by a user in artificial or natural light, as well as in the dark.

SUMMARY OF THE INVENTION

The present invention accomplishes its objects by way of an information data transparent card carrying a large volume of data under a greatly reduced format, which is manually dropped through a slot in a dashboard or instrument panel, and which is automatically indexable in the aperture window of a projection system built-in behind the dashboard or instrument panel projecting on a rear illumination screen a magnified image of at least a portion of the information carried by the selected microfilm transparency card. When no longer needed, the transparency card is released from its position in the aperture window on the optical axis of the projection system and dropped in an appropriate receptacle.

The device of the present invention may be built-in, during manufacture of the vehicle, behind the dashboard or instrument panel, or it may be added to already existing vehicles in the form of a self-contained unit mounted in an appropriate space behind the face of the dashboard or instrument panel or within an already existing space such as a glove compartment or the like.

BRIEF DESCRIPTION OF THE DRAWING

FIG. 2 is a section thereof along line 2—2 of FIG. 1;

FIG. 3 is a partial section thereof along line 3—3 of FIG. 2;

FIG. 4 is a partial view thereof from line 4—4 of FIG. 3;

FIG. 5 is a partial sectional view thereof from line 5—5 of FIG. 4; and

DETAILED DESCRIPTION OF THE PREFERRED EMBODIMENT

Figure 1:
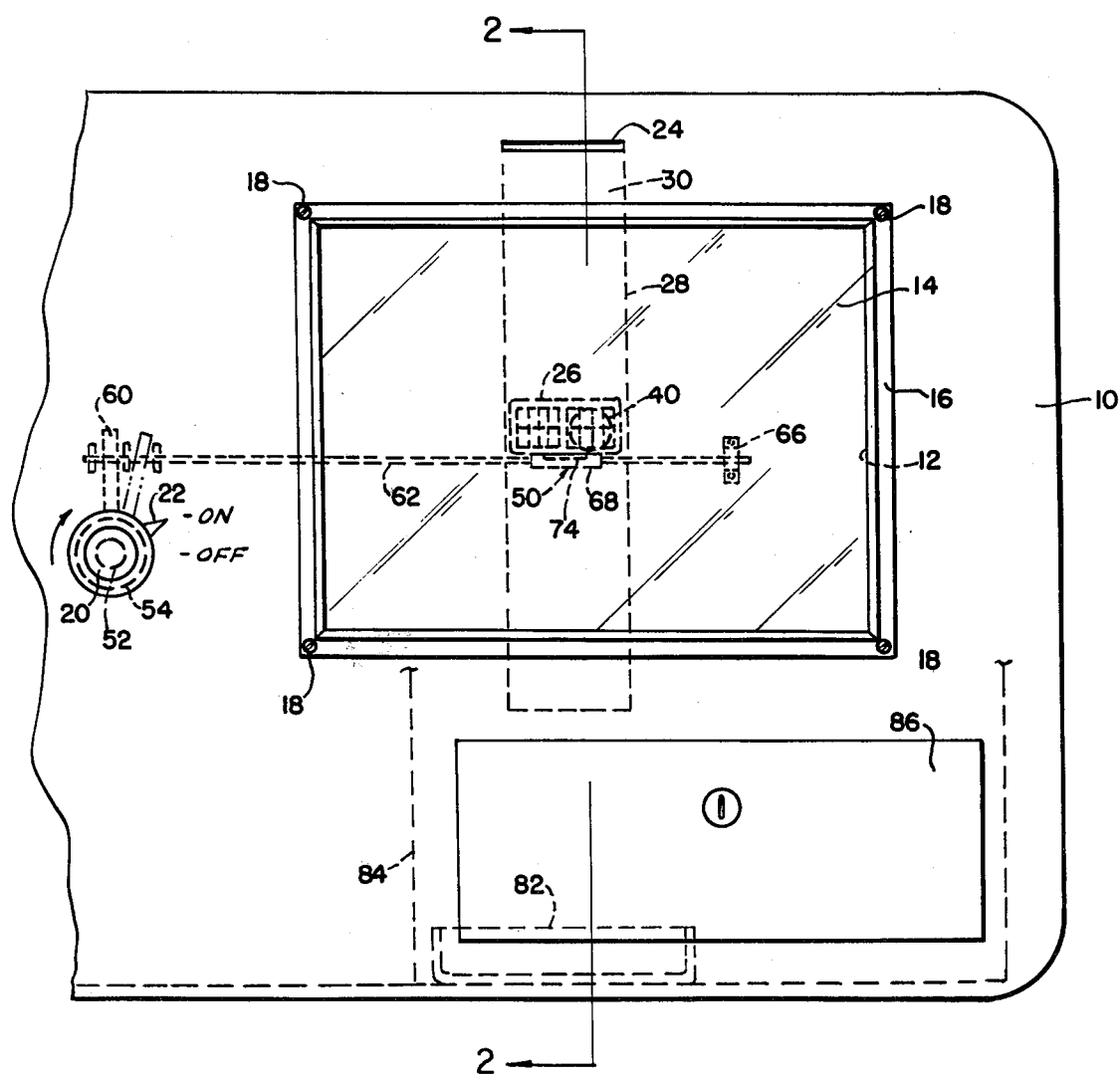
FIG. 1 is a schematic front elevation view of a vehicle dashboard or instrument panel provided with an information data card projection device according to the present invention.

Referring now to the drawing, and more particularly to FIGS. 1-3 representing a structural embodiment of an information data viewer according to the present invention, the dashboard or instrument panel 10 of a vehicle, such as an automobile for example, is provided with an opening 12 covered by a rear projection screen 14 held in position by any appropriate conventional holding means such as, for example, a decorative molding frame 16 fastened to the edge of the opening 12 by way of self-tapping screws 18 or the like. If so desired in order to shield the screen 14 from ambient light, the screen 14 may be mounted recessed from the face of the dashboard or instrument panel 12, or, in the alternative, the molding 16 may be provided with a forwardly projecting flange (not shown) entirely surrounding the screen 14. The rear projection screen 14 is made of any appropriate convenient translucent material conventionally used for rear projection screens, preferably a sheet of translucent plastic material.

A rotatable control knob 20 is mounted on the face of the dashboard or instrument panel 12 proximate a side of the screen 14. The control knob 20 has a pointer 22 indicating the mode of operation of the viewing device, such as "on" and "off".

A slot 24 is disposed in the top panel of the dashboard or instrument panel 10. The slot 24 permits to manually insert an appropriate information data bearing transparent card, of the general form as the transparent card 26, illustrated at FIG. 6. The slot 24 defines the top opening of a chute 28 slidably accepting any transparent card 26 introduced through the slot 24. The chute 28 is substantially rectangular in cross-section with a frontal wall 30, a rear wall 32, and a pair of opposite parallel narrow lateral walls 34, as best shown at FIGS. 2 and 3. A viewing aperture window 36 is disposed, in the form of a cut-out portion, in the chute front wall 30 and is provided with an appropriate lens mount 38 supporting a projection lens 40. The rear wall 32 is provided with a corresponding aperture window 42 allowing the light emitted by a projection lamp 44 mounted in a lamp support 46, to pass through the transparent card 26, such that an image of the information data indicia on the back of the translucent screen 14 is projected through the lens system 40. The projection lamp support 46 is preferably made integral with a parabolic or hemispherical reflector 48 provided with a reflective inner surface. The reflector 48 is removably fastened, such as by means of mounting screws 49, or by means of spring clips or the like, to the rear surface of the chute rear wall 32, around the periphery of the aperture window 42.

Stop means, generally designated at 50, are provided for arresting the transparency card 26 in registry with the aligned aperture windows 36 and 42 through the chute 28. The stop means 50 are operated by the control knob 22. The control knob 22 is mounted on the end of a shaft 52 projecting through the end faces of an on-off switch 54 closing or opening the circuit of the projection lamp 44, a wire 56 leading from the insulated base of the projection lamp 44 to the switch 54 and a line 58 being connected from the switch 54 to the ungrounded common terminal of the vehicle electrical system. The electrical circuit to the grounded terminal of the electrical system is completed through the ground, as is conventionally done in connecting electrical components to a vehicle electrical system. When the control knob 22 is rotated from its "off" position to its "on" position, FIG. 1, the shaft 52, supported at its free end by a journal bearing 59, supported by a panel or bracket, not shown, forming part of the instrument panel structure, is also rotated, and an arm 60 mounted on the end of the shaft 52 is rotated counter-clockwise, FIGS. 1 and 3. Such counter-clockwise rotation of the arm 60 pulls on a rod 62 slidably supported at its free end by a bearing 64 disposed on the end of a bracket 66, FIG. 4, mounted on the front wall 30 of the chute 28. A camming member 68 is affixed over the rod 62 proximate the bearing 64, and has an inclined camming surface 70 engaged with the inclined end surface 72 of a plunger 74 slidably mounted in a support housing 76 such as to project through a horizontal slot 78 formed through the front wall 30 of the chute 28 below the aperture window 36. A coil spring 80, under tension, has an end attached to the plunger 74 and its other end attached to the camming member 68, such that the inclined end surface 72 of the plunger 74 and the camming surface 70 of the camming member 68 are constantly in engagement with each other. When the control knob 22 is rotated from its "off" position to its "on" position, in addition to turning on the projection lamp 44 by means of the switch 54, the rod 62 is pulled, thus causing the plunger 74 to project through the slot 78 within the chute 28, and in turn causing a transparency card 26 dropped through the slot 24 and travelling downwardly by gravity in the chute 28 to be stopped in registry with the aperture windows 36 and 42. When the control knob 22 is rotated from its "on" position to its "off" position, the switch 54 opens the circuit of the projection lamp 44 while, simultaneously, the rod 62 is pushed rightwardly, as seen in FIGS. 3 and 4, thus displacing the camming member 68 to the position shown in phantom line at FIG. 4, and causing retraction of the plunger 74 to a position substantially flush with the inner surface of the front wall 30 of the chute 28. The transparency card 26 is free to fall farther down the chute 28 and drop in the tray 82 disposed, for example, in the glove compartment 84, or in any other appropriate compartment, accessible through the door 86. The control knob 22 may be left in the "off" position or, if it is desired to provide a display of another transparency card, it is returned to the "on" position and another card is dropped in the chute 28 through the slot 24.

Figure 6:
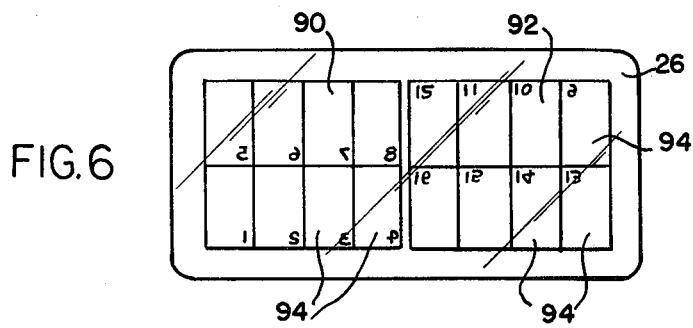
FIG. 6 is an example of information data transparency card for use with the projection device of the present invention.

It has been found convenient to provide the transparency card 26, FIG. 6, with two half-portions disposed side by side, and to place the projection system consisting of the projection lamp 44 and its mount 46, and the lens 40 on a side of the chute 30 rather than at its center, such that only one-half of the transparency card is projected on the screen 14 and, if it is desired to examine the information data carried by the second half of the transparency card 26, the card is simply flipped over and reinserted in the chute 28, such as to project its other half-portion on the screen 14.

FIG. 6 represents an example of transparency card 26 provided with such half-portions or panels 90 and 92. Each of the panels, 90 or 92, in turn consists of a single photographic frame of microfilm which includes, for example, eight or more standard size typewritten or printed pages 94, such as pages of an operator's manual, or a checklist or the like, under greatly reduced size, such as, for example, a reduction of 12 to 1, 25 to 1, or the like, which may be magnified back to a legible size and projected on the rear projection screen 14. A transparency card 26, for example 80×40 mm. in size, obtained by the system and method disclosed in detail in prior application Ser. No. 955,790, filed Oct. 30, 1978 for Indicia Bearing Plastic Laminate and Method of Producing Same, and using two frames of 35 mm. microfilm, can thus include, for example, sixteen or more ordinary book-size pages.

It will be readily appreciated that although the microfilm transparency card viewing device of the present invention has been illustrated and described in the form of a unit built in the dashboard or instrument panel of a vehicle, the whole assembly can be made self-contained and portable such as to be capable of mounting either in an available space behind the instrument panel, on the top of the instrument panel or on a side panel of a vehicle.

Having thus described the present invention by way of a structural embodiment thereof, modification whereof will be apparent to those skilled in the art, what is claimed as new is as follows:

I claim:

1. A vehicular information data display system comprising a rear projection screen, a gravity chute having a portion disposed substantially parallel to said rear projection screen, an aperture window in said chute, an illumination device mounted on said chute behind said aperture window, a lens system mounted on said chute in front of said aperture window, said illumination device, aperture window and lens system being optically substantially aligned with the center of said rear projection screen, a transparency card bearing information data indicia and adapted to be gravity fed in said chute, means for arresting said transparency card in said chute in register with said aperture window, and means for turning "on" and "off" said illumination device and for turning "on" and "off" said arresting means, wherein said window aperture, illumination device and lens system are disposed along an optical axis eccentric relative to the center line of said chute for projecting on said screen a lateral half of said transparency card.

2. The data display system of claim 1 wherein said rear projection screen is mounted on an aperture in the face of an instrument panel.

3. The data display system of claim 1 wherein said chute has a lower end disposed in a glove compartment.

4. A vehicular information data display system comprising a rear projection screen, a gravity chute having a portion disposed substantially parallel to said rear projection screen, an aperture window in said chute, an illumination device mounted on said chute behind said aperture window, a lens system mounted on said chute in front of said aperture window, said illumination device, aperture window and lens system being optically substantially aligned with the center of said rear projection screen, a transparency card bearing information data indicia and adapted to be gravity fed in said chute, means for arresting said transparency card in said chute in register with said aperture window, and means for turning "on" and "off" said illumination device and for turning "on" and "off" said arresting means, wherein said means for turning "on" and "off" said illumination device and said arresting means comprises a single control, said control being connected to a switch for turning "on" and "off" said illumination device and to a mechanical link for introducing into and retracting from said chute a movable plunger disposed below said aperture window.

5. The data display system of claim 4 wherein said rear projection screen is mounted on an aperture in the face of an instrument panel.

6. The data display system of claim 5 wherein said chute has a lower end disposed in a glove compartment.

7. The data display system of claim 4 wherein said window aperture, illumination device and lens system are disposed along an optical axis eccentric relative to the center line of said chute for projecting on said screen a lateral half of said transparency card.

* * * * *